Patented Nov. 29, 1932

1,889,027

UNITED STATES PATENT OFFICE

WILLIS F. WASHBURN, OF ST. LOUIS, MISSOURI, ASSIGNOR TO TITANIUM PIGMENT COMPANY, INC., OF NEW YORK, N. Y., A CORPORATION OF MAINE

RECOVERY OF TITANIUM COMPOUNDS

No Drawing.  Application filed April 12, 1927. Serial No. 183,245.

My invention relates more particularly to the recovery of water soluble titanium compounds and solutions from titaniferous materials, such as ilmenite, which constitutes a readily available source of titanic acid.

The objects of my invention are, among other things to provide improved and more practical and economical methods for effecting such recoveries of titanium compounds than have heretofore been known. Such methods broadly comprise treating a ground titaniferous material with acid in a suitable reaction vessel or container so as to produce titanium compounds that are easily soluble in water or weak acid, while a minimum amount of heat, other than that produced in the reaction, is ordinarily required to obtain the necessary recoveries of titanium compounds.

The heretofore known methods for obtaining titanium compounds may be divided into three classes:—

(1) Fusion of the titaniferous materials with acid alkali sulphates, such as nitre cake, in electric or other furnaces, cooling the melt to a solid mass and subsequently dissolving it in water.

(2) Treating titaniferous materials with concentrated sulphuric acid with or without alkali sulphates by heating in iron or other containers in furnaces or ovens to formation of a solid mass which can be cooled, broken up and dissolved.

(3) Titaniferous materials are treated with sulphuric acid while heating by injection of steam, the concentration meanwhile being controlled and regulated by original acid strength and steam condensation always to keep the charge in liquid condition.

I have discovered an improved method of treating titaniferous materials with sulphuric acid which yields a mass very readily and substantially completely soluble in water while entirely dispensing with furnacing operations. This result I attain by taking advantage of, and relying mostly upon, the heat of reaction for heating the charge as well as for maintaining the temperature and also in completing the reaction.

I have also discovered that if the acid or charge is preliminarily heated to suitable temperature, say from 80° to 120° C. depending on the characteristics of the ores used, the chemical reaction can then be started or initiated by injecting a very little water in a liquid state, preferably cold, the reaction thereafter continuing to completion without application of heat other than that due to chemical reaction. This preheating of the charge may be done in any convenient manner, as by preheating the acid or ore or by injecting steam or hot air into the mixed charge within the reaction vessel by means of any suitable equipment. With some ores the preheating is accomplished by the heat of reaction between the ore and acid during mixing.

The reaction, after being initiated as described, proceeds with great energy, developing a high temperature so that much water is evaporated and the product of reaction is in the nature of a solid, but distinguished from the furnaced product of method "2" heretofore described as aforesaid in that it has a very porous or cellular structure.

I have discovered that the cellular structure can be produced by blowing air or other gas through the charge during the reaction. To this cellular condition of the mass I attribute its exceptional solubility which is an important feature of my process, as it permits the solution of the reaction product to be carried out in the reaction tank and avoids the expensive handling of solids incident to the prior art methods which I have indicated in the prior known methods (1) and (2).

The violence or energy of chemical reaction varies with the character of titaniferous material being treated—with some ores the reaction is rather vigorous. But I have discovered that the reaction can be to a considerable extent controlled, accelerated, or retarded by regulating the volume and temperature of the air or other gas blown through the charge during reaction.

With certain ilmenites initial heating of the charge is not necessary, but the continuous mixing or stirring of the titaniferous materials in finely-divided form with strong sulphuric acid will produce a complete reaction without further application of heat.

My invention is susceptible to many modifications, such as the reaction vessel or container to be used, the method of initially heating the mixture when required, the gas to be passed through the mixture, the acid concentration, etc. But, to enable those skilled in this art to clearly understand the invention, the following specific example will show one way of carrying out my improved methods:

Ten tons of ground or pulverized ilmenite the fineness of which depends somewhat on the composition of the ore) is mixed with from ten to twenty-two tons of sulphuric acid (preferably 72-92% $H_2SO_4$) in a suitable reaction vessel or container. I may successfully use other concentrations of sulphuric acid with the finely-divided titaniferous material; preferably the sulphuric acid is in proportions not substantially exceeding the chemical equivalent of the metallic elements in the titaniferous materials. Steam is now preferably passed into the mixture within the reaction vessel in any suitable manner as by a pipe delivering the steam near the bottom of the vessel whereby the injected steam may preheat the charge until the mass reaches a temperature ranging substantially from 50° to 160° C. with a preferred range of from 80° to 120° C. depending somewhat upon the ore used. With Nelsonite I have found that the best operating temperature is about 80° C., while Florida and Senegalese ores require about 120° C. The optimum temperature for Brazilian ore is approximately 130° C. This preliminary heating for Nelsonte, Florida and Senegalese ores continues for about 35 to 40 minutes, while for Brazilian ores 50 minutes is usually required. At the end of this time the charge tends to thicken and a small amount of water (2 to 12 quarts) is introduced into the charge preferably by several lead pipes which terminate within a few inches of the bottom of the reaction vessel whereby localized heating is produced in that part of the charge. Shortly after this water is introduced the reaction takes place with violence during which copious fumes are evolved. In most cases a single addition of water is sufficient when the reaction starts immediately from the heat produced by dilution of the acid, and such reaction will continue to completion without further application of heat. The introduction of small amounts of water may be repeated from time to time to maintain the reaction until completion, while the heat of reaction is preserved throughout due to the reaction of acid and titaniferous material.

With certain ores, such as Norwegian ilmenite, the mixing and stirring of such ores, in finely-divided form with strong sulphuric acid for several hours in the reaction vessel will cause the reaction to take place without any preliminary heating or without addition of water to the charge, since the heat of reaction is in itself sufficient to allow the reaction to proceed to completion.

While the reaction is taking place, the mixture is preferably agitated or aerated vigorously by air or other gas which may effectively be injected into the reaction charge through a plug having a hollow stem within the reaction vessel. This agitation or aeration tends to prevent any undecomposed ore from settling in the bottom and also effectively serves to control the reaction. In case the reaction becomes too violent or proceeds too fast, such reaction may be slowed down by the introduction of a greater quantity of air or gas, or by a cold gas, or by mechanical agitation which would permit the gaseous products of reaction to escape more readily and would also keep the reacting charge from rising too high within the reaction vessel.

At the completion of the reaction which is indicated by the cessation of fumes, the final reaction product usually approaches a more or less solid condition in the form of cake, and holds within its mass a quantity of gas to render it porous and easily dissolved with the addition of water.

The air is now shut off and water or weak acid is then injected into the mass, preferably through the air pipe or pipes, in a quantity sufficient to dissolve the mass which dissolves very readily due probably to the continuous introduction of air or gas into the mixture with resultant agitation or aeration during the reaction. Since the final reaction mass is extremely porous, the water when introduced readily penetrates and thoroughly dissolves the entire mass, thereby forming water soluble titanium compounds in the form of sulphates with the exception of a very small amount of residue which remains unreacted in the reaction vessel.

If it is desired to reduce any ferric iron present in this solution or to reduce some of the titanic sulphate to titanous sulphate, this may be readily accomplished by emersing in the solution lead baskets containing a metal such as iron or zinc.

My invention is susceptible to wide modifications in the character of the equipment used including the methods of preheating the mixture when conditions require preheating, the acid concentration and the manner of agitating the mass during reaction. The foregoing illustrative example is given to show one practical way of carrying out my improved recoveries of water soluble titanium compounds whereby a minimum amount of heat is usually required. When sufficiently strong acid is used with certain ores in the process, the heat generated by stirring the mixture or by the addition of a comparatively small amount of water is enough to bring about the reaction. It is also of great practical advantage to be able readily to dissolve the reaction mass by introducing water within the reaction vessel itself immediately after completion of the reaction and without removing such mass from the vessel. In the appended claims in which the introduction of water to the charge is set forth, such water is in the liquid state and preferably cold.

I claim as my invention:

1. In the method of recovering water soluble titanium compounds from titaniferous materials digested with sulphuric acid in proportions not substantially exceeding the chemical equivalent of the metallic elements in said materials, the step which consists in maintaining the reaction charge in an aerated condition to the end of the reaction.

2. In the method of recovering water soluble titanium compounds from titaniferous materials digested with sulphuric acid in proportions not substantially exceeding the chemical equivalent of the metallic elements in said materials, the step which consists in maintaining the reaction charge in an aerated condition to the end of the reaction to yield a porous soluble reaction product.

3. The method of recovering water soluble titanium compounds from titaniferous materials which comprises heating a mixture of said materials and sulphuric acid in proportions not substantially exceeding the chemical equivalent of the metallic elements in said materials until the charge thickens, introducing water to initiate the reaction, aerating the charge to the end of the reaction, and dissolving the reaction product with water.

4. The method of recovering water soluble titanium compounds from titaniferous materials which comprises heating between 50° and 160° C. said materials and sulphuric acid in proportions not substantially exceeding the chemical equivalent of the metallic elements in said materials, introducing water to initiate the reaction, aerating the charge to the end of the reaction, and dissolving the reaction product with water.

5. The method of recovering water soluble titanium compounds from titaniferous materials which comprises heating between 80° and 120° C. said materials and sulphuric acid in proportions not substantially exceeding the chemical equivalent of the metallic elements in said materials, introducing water to initiate the reaction, aerating the charge to the end of the reaction, and dissolving the reaction product with water.

6. The method of recovering water soluble titanium compounds from titaniferous materials which comprises heating between 50° and 160° C. a mixture of said materials and sulphuric acid in proportions not substantially exceeding the chemical equivalent of the metallic elements in said materials, introducing water to initiate and maintain the reaction, aerating the charge to the end of the reaction, and dissolving the reaction product with water.

7. The method of recovering water soluble titanium compounds from titaniferous materials which comprises heating between 80° and 120° C. a mixture of said materials and sulphuric acid in proportions not substantially exceeding the chemical equivalent of the metallic elements in said materials, introducing water to initiate and maintain the reaction, aerating the charge to the end of the reaction, and dissolving the reaction product with water.

8. In the method of recovering water soluble titanium compounds from a mixture of titaniferous materials and strong sulphuric acid, the steps which consist in introducing water to the mixed charge to initiate the reaction, and making additions of water to the reacting charge to maintain the reaction to practical completion.

9. In the method of recovering water soluble titanium compounds from a mixture of titaniferous materials and strong sulphuric acid, the step which consists in adding water to the mixed charge to initiate the reaction.

10. In the method of recovering water soluble titanium compounds from titaniferous materials digested with sulphuric acid in proportions not substantially exceeding the chemical equivalent of the metallic elements in said materials, the steps which consist in introducing water to the charge to initiate the reaction, making further additions of water to the reacting charge to maintain the reaction to practical completion, and aerating said charge throughout the reaction.

11. In the method of recovering water soluble titanium compounds from titaniferous materials digested with sulphuric acid, the steps which consist in introducing a relatively small amount of water to the charge to initiate the reaction, making further additions of water to the reacting charge to maintain the reaction to practical completion, and aerating said charge throughout the reaction.

12. In the method of recovering water soluble titanium compounds from titaniferous materials by treating same with sulphuric acid in proportions not substantially exceeding the chemical equivalent of the metallic elements in said materials, the step which consists in aerating the charge to control the reaction throughout said charge to its completion.

13. In the method of recovering water soluble titanium compounds from titaniferous materials mixed with strong sulphuric acid in proportions not substantially exceeding the chemical equivalent of the metallic elements in said materials, the steps which consist in introducing water to the mixed charge to initiate the reaction, maintaining the reaction to practical completion by further additions of water, and agitating the mixed charge to control the reaction.

14. In the method of recovering water soluble titanium compounds from titaniferous materials mixed with strong sulphuric acid in proportions not substantially exceeding the chemical equivalent of the metallic elements in said materials, the steps which consist in introducing water to the mixed charge to initiate the reaction, maintaining the reaction to practical completion by further additions of water, and introducing gas under pressure into the mixed charge to control the reaction.

15. The method of recovering water soluble titanium compounds from titaniferous materials which comprises heating between 50° and 160° C. a mixture of said materials and strong sulphuric acid in proportions not substantially exceeding the chemical equivalent of the metallic elements in said materials by injecting steam thereto, introducing water to this preheated charge to initiate the reaction, introducing gas under pressure to control the reacting charge, and treating the latter with water to recover water soluble titanium compounds therefrom.

16. The method of recovering water soluble titanium compounds from titaniferous materials which comprises heating between 80° and 160° C. a mixture of said materials and strong sulphuric acid in proportions not substantially exceeding the chemical equivalent of the metallic elements in said materials by injecting steam thereto, introducing water intermittently to this preheated charge to initiate and maintain the reaction to completion, introducing gas under pressure to control the reaction, and treating the reaction product with water to recover water soluble titanium compounds therefrom.

17. The method of recovering water soluble titanium compounds from titaniferous materials which comprises preheating a mixture of said materials and strong sulphuric acid in proportions not substantially exceeding the chemical equivalent of the metallic elements in said materials, initiating the reaction by introducing water into the mixed charge, and introducing gas under pressure to the reacting charge.

18. The method of recovering water soluble titanium compounds from titaniferous materials which comprises preheating between 50° and 160° C. a mixture of said materials and strong sulphuric acid in proportions not substantially exceeding the chemical equivalent of the metallic elements in said materials, initiating the reaction by introducing water into the mixed charge, and introducing a heated gas under pressure to the reacting charge to form a porous solid water soluble reaction product.

19. The method of recovering water soluble titanium compounds from titaniferous materials which comprises preheating between 80° and 120° C. a mixture of said materials and strong sulphuric acid in proportions not substantially exceeding the chemical equivalent of the metallic elements in said materials by injecting steam thereto, initiating the reaction by introducing water to the mixed charge, and introducing a heated gas under pressure to the reacting charge.

20. In the method of recovering water soluble titanium compounds from titaniferous materials, the steps which consist in initiating the reaction by treating said materials with sulphuric acid in proportions not substantially exceeding the chemical equivalent of the metallic elements in said materials with generation of heat, then maintaining the reaction by introducing water to the charge and aerating said charge while allowing the reaction to proceed to completion without further application of heat.

21. In the method of recovering water soluble titanium compounds from a mixture of titaniferous materials and strong sulphuric acid, the step which consists in maintaining the reaction of said mixed charge to substantial completion by successive additions of water to the reacting charge.

22. In the method of recovering water soluble titanium compounds from titaniferous materials, the steps which consist in stirring said materials in finely-divided form with sulphuric acid in proportions not substantially exceeding the chemical equivalent of the metallic elements in said materials with generation of heat, and aerating the reacting charge to the end of the reaction without further application of heat.

23. The method of recovering water soluble titanium compounds from titaniferous materials in one reaction vessel, which comprises mixing said materials and strong sulphuric acid, adding water to the mixed charge to develop the reaction, allowing the reaction to proceed to form a soluble reaction product, and then dissolving this reaction product with water in the same reaction vessel.

24. The method of recovering water soluble titanium compounds from titaniferous materials in one reaction vessel, which comprises mixing said materials and strong sulphuric acid in said vessel, introducing water to the mixed charge to develop the reaction, allowing the reaction to proceed while aerating said charge to the end of the reaction, and then dissolving this reaction product with water in the same reaction vessel.

25. The method of recovering water soluble titanium compounds from titaniferous materials which comprises heating between 50° and 160° C. a mixture of said materials and sulphuric acid in proportions not substantially exceeding the chemical equivalent of the metallic elements in said materials by injecting steam thereto, introducing air or inert gas under pressure to the reacting charge throughout the hardening phase to form a porous solid soluble reaction product, and treating the latter with water to recover water soluble titanium compounds therefrom.

WILLIS F. WASHBURN.